United States Patent [19]

Shah et al.

[11] Patent Number: 4,705,471
[45] Date of Patent: Nov. 10, 1987

[54] MOLD FOR PRODUCING A PLATE

[75] Inventors: Ashwin N. Shah, Fairport; Roland DeMay, Newark, both of N.Y.

[73] Assignee: Mobil Oil Corporation, New York, N.Y.

[21] Appl. No.: 761,951

[22] Filed: Aug. 2, 1985

[51] Int. Cl.⁴ .................. B29C 33/42; B29C 43/46
[52] U.S. Cl. .................. 425/195; 425/398; 425/412; 425/416
[58] Field of Search ............ 425/182, 193, 195, 398, 425/412, 416; D7/33, 36, 43, 23; D15/135, 136; 493/104, 108; 249/102, 104, 112

[56] References Cited

U.S. PATENT DOCUMENTS

| 267,659 | 11/1882 | Atterbury | 249/104 |
| 590,365 | 9/1897 | Dechant | 249/104 |
| 2,733,493 | 2/1956 | Bryer | 264/320 |
| 3,305,434 | 2/1967 | Dernier et al. | 425/398 |
| 3,322,074 | 5/1967 | Malnory | 249/102 |
| 3,354,509 | 11/1967 | Ammondson | 249/241 |
| 3,380,121 | 4/1968 | Chittenden et al. | 425/528 |
| 3,444,283 | 5/1969 | Carlson | 264/53 |
| 3,518,335 | 6/1970 | Jablonski | 425/44 |
| 3,684,633 | 8/1972 | Haase | 428/66 |
| 3,684,637 | 8/1972 | Anderson et al. | 156/72 |
| 3,720,365 | 3/1973 | Unger | 229/2.5 |
| 3,876,361 | 4/1975 | Irwin | 425/388 |
| 4,547,139 | 10/1985 | Hershberger | 425/195 |

FOREIGN PATENT DOCUMENTS

| 872344 | 7/1961 | United Kingdom | 249/104 |
| 355037 | 10/1972 | U.S.S.R. | 425/195 |

Primary Examiner—Willard E. Hoag
Attorney, Agent, or Firm—Alexander J. McKillop; Michael G. Gilman; Charles J. Speciale

[57] ABSTRACT

A thermoformed plate having a rim adapted for embossing thereon a decorative pattern is provided. The rim has a generally curved profile which eliminates stress concentration points, providing greater stiffness and strength to the plate. A dual member mold useful in the production of the plate is also provided. The mold has corresponding male and female members, and contains an interchangeable annular insert in that portion of the surface of the male mold member that defines the rim of the plate. The desired decorative pattern for the plate is contained on the annular insert, allowing changes to be made in the rim pattern of plates produced by the mold without the need to replace the entire mold.

6 Claims, 4 Drawing Figures

MOLD FOR PRODUCING A PLATE

BACKGROUND OF THE INVENTION

This invention relates to the thermoforming of plastic plates or dishes and more particularly to thermoformed plastic plates having a novel rim profile that provides enhanced strength and stiffness. The invention further relates to a dual-member mold for thermoforming the plate and particularly to a mold whose male member is adapted to receive interchangeable ring inserts carrying decorative patterns, whereby the rim of plates produced in the mold can be embossed with different patterns with minor change to the mold itself.

The art of shaping or molding thermoplastic materials in the presence of heat, known as thermoforming, has been practiced in the prior art to produce disposable articles for serving food. In the specific case of plates or dishes, the operation has comprised preheating a sheet of foamed thermoplastic material and impressing the preheated sheet between corresponding male and female mold members, forcing the sheet to assume the configuration of the mold cavity. These plastic plates, however, often have less strength than is desirable since the plastic foam material is not itself structurally strong. For example, foamed polystyrene, although desirably light weight and insulating in nature, does not always provide sufficient strength in a plate or dish, particularly at the rim of a plate, which because of its contours, often contains stress concentration points at which a break or bend is more likely to occur.

Additional strength has been provided to plates by use of relatively thick sheets of thermoplastic material in the plate forming process, providing denser or thicker plates, but this solution is undesirable economically. In another procedure, U.S. Pat. No. 3,684,633 discloses a foamed polystyrene dish which is laminated with a thin film of an oriented thermoplastic material, such as biaxially oriented heat-sealable polystyrene film. Although plates as described in this patent have much improved structural and other characteristics, the preparation of such plates requires the additional laminating step, which undesirably increases the cost.

To meet consumer desires, plastic plates and dishes are often embossed on the rims with a decorative pattern. This pattern is applied to the rim during the thermoforming step itself, the mold carrying the corresponding shape of the pattern on an appropriate surface thereof. Embossing or imprinting the plate rim, however, often creates additional stress concentration points, by virtue of the surface deformation of the material that takes place during embossing, and therefore affects the structural integrity of the rim, leading to decreased strength.

Additionally, a major cost in the molding of plastic plates having differing rim patterns is the need to have molds corresponding to each different pattern. Molds are quite expensive, and a plastic plate manufacturer must either expend considerable sums to keep several molds ready or to produce entirely new molds whenever a new rim pattern is desired. Although there have been attempts to overcome this problem by using inserts in molds for embossing design, generally these inserts have been for patterns covering an insubstantial portion of the surface of the molded article, and have not been used for thermoforming foamed sheets into plates or dishes having decorative rim patterns. U.S. Pat. No. 3,380,121 discloses a multi-member mold for blow molding thermoplastic containers which has a removable insert in each member to allow the exterior of the containers to be changed by using different inserts. In these molds, however, the inserts define most of the interior mold surface, and the molds themselves are not used in thermoforming sheets, the manner in which plastic plates are made, but rather in blow molding operations.

SUMMARY OF THE INVENTION

The present invention provides a dual-section mold for use in thermoforming a thermoplastic material into the shape of a plate comprising (a) a dual-section mold body having corresponding male and female members which define a cavity in the shape of a circular plate when in the closed position, said plate shape having a substantially flat circular base and an outwardly sloping annular rim, said male member having an annular shaped recess formed therein in the portion of said member that defines the annular rim of the plate shape; (b) a removable ring-shaped insert adapted to be disposed within the recess and to provide thereby a surface of the male member defining the mold cavity; and (c) means for securing the insert within the recess, said means adapted for removal and replacement of the insert. The invention also provides a method thermoforming plastic plates using the mold.

The mold allows the production of plastic plates having differing rim patterns without the need or cost of replacing the entire mold. The ring-shaped insert contains the desired rim design, and it, rather than the entire mold, can be easily substituted with an insert carrying a different pattern. The need to re-machine or replace the entire mold is eliminated. There is particularly great cost savings in the production of plates where an assembly of molds in combination is employed to form a plurality of plate shapes simultaneously on a large section of thermoplastic polymer sheet. The ring inserts can be interchanged on the molds without the need to dismantle the mold assembly itself.

In another aspect, the present invention provides a foamed thermoplastic circular plate, which can be manufactured by use of the above mold. The plate has a flat base and an integral annular rim extending upwardly and outwardly from the base; said rim being generally curved and having an interior profile which, in sequence from the junction of the rim and the base, has a concave segment, a first convex segment, a first flat segment, a second convex segment, and a second flat segment which defines the outer edge of the rim; the linear dimension of the first flat segment being about 20–25% of the total linear dimension of the rim profile.

The curved rim profile of the plate of this invention eliminates many of the stress concentration points that usually inhere in curve transition points, and therefore the plate of this invention has relatively high strength, without the need for a laminate or increased thickness. In practical terms, the plate can be held at the rim, and more food placed thereon, with less chance that the plate will break or bend. The rim can be embossed on the interior side during molding without adverse effect on the rim strength. The profile of the present plate permits such embossing without the creation of additional stress concentration points at which breaks or bends can occur.

DETAILED DESCRIPTION OF THE INVENTION

The mold of this invention is useful in the conventional procedure by which thermoplastic plates or dishes are formed. That is, a sheet of foamed polymeric material is heated to a temperature at which the material is sufficiently softened, and is then disposed between the corresponding male and female portions of a mold having the desired shape. Normally, the male mold member is positioned below the sheet and is vertically aligned for corresponding engagement with the female mold member positioned above the sheet. The two mold members are then engaged to compress the sheet and conform the portion therebetween to the mold shape. The molds are normally maintained at a temperature cooler than the pre-heat temperature of the polymeric sheet, so that deformation of the molded shape does not occur when the mold is released. At the conclusion of the thermoforming operation, the shape is trimmed from the polymeric sheet. The sheet material can be of such size that a plurality of molds acts upon the material at the same time in order to simultaneously produce a plurality of shapes in the sheet. The mold of the present invention is particularly useful in the thermoforming process described above, particularly where a plurality of such molds are used simultaneously on a polymeric sheet of large dimension.

Figure 1:
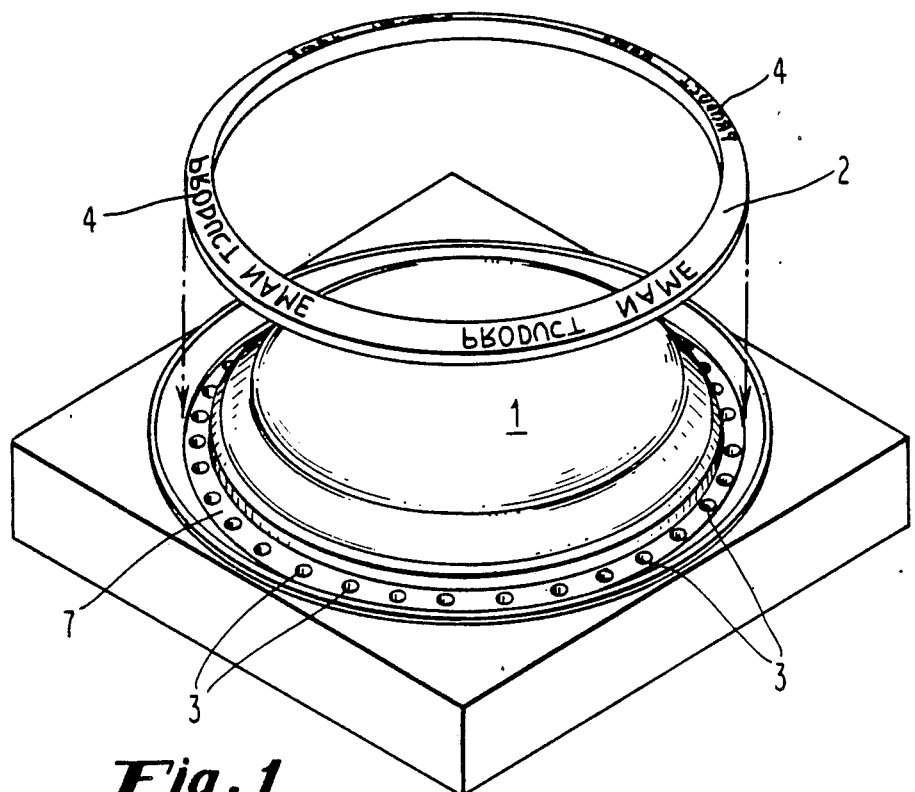
FIG. 1 is an exploded view of the male portion of the mold of this invention showing the position of the insert.
Figure 2:
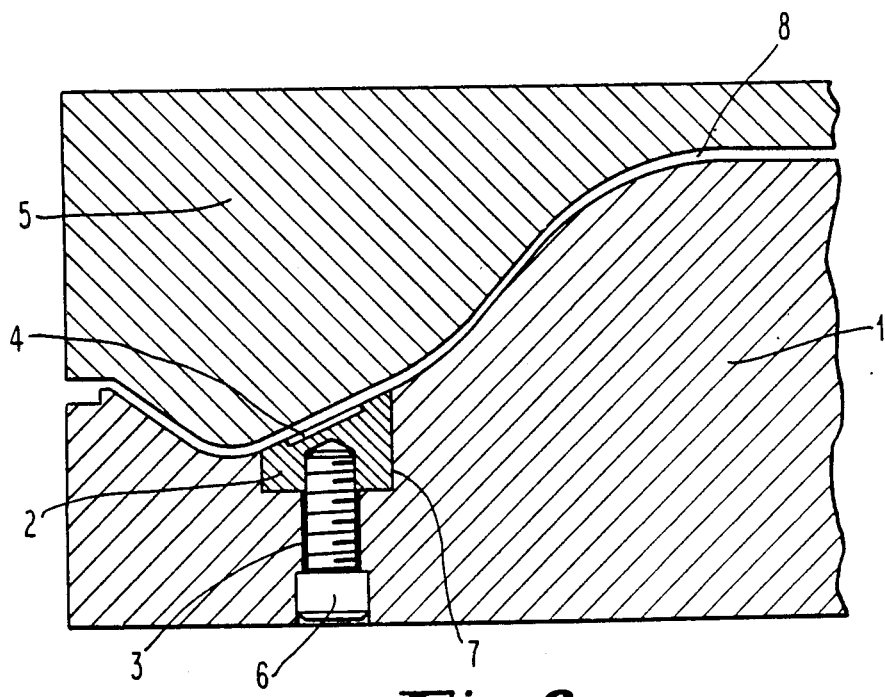
FIG. 2 is a fragmentary cross section of the male mold member of FIG. 1 along a radius thereof showing the insert disposed with the male member, and showing the corresponding female mold member in closed position therewith.

FIGS. 1 and 2 illustrate an exemplary embodiment of the mold of this invention. As shown in FIG. 1, the male member has a surface 1 generally defining a circular plate shape. A removable ring-insert 2 is adapted to fit within the correspondingly shaped recess 7 in the surface 1 of the male member. The mold member contains fastening holes 3 which extend from the surface of the recess through the back of the mold and which are adapted to receive appropriate fastening means, such as screws or bolts, which will engage corresponding fastening holes (not shown) in the ring-insert. The exposed face 4 of the ring-insert 2 contains the outlines of a decorative pattern. When the ring-insert is disposed and fastened within the recess, the exposed face 4, and the decorative pattern carried thereon, define a functional portion of male member surface 1. It will be recognized, however, that an interchangeable ring-insert may be used which carries no decorative pattern, thus having a smooth exposed face 4, for use in the manufacture of unembossed on unpatterned plates.

FIG. 2 illustrates the male mold member in operational engagement with the corresponding female mold member. More particularly, when the dual-section mold of this invention is in the closed position as shown in FIG. 2, the surfaces of male member 1 and female member 5 define a cavity 8 between them, into the shape of which the polymeric sheet (not shown) is compressed or molded. Male member 1 defines the interior, or food-receiving, surface of the plate, and female member 5 defines the exterior surface of the plate. Depicted in FIG. 2 is a limited but representative cross section showing the portion of the mold, and the corresponding portion of cavity 8, that defines a generally curved rim of a circular plate. Ring-insert 2 is disposed in recess 7 and is held in place within the recess by threaded bolts 6 which are placed through fastening holes 3. The exposed face 4 of the ring-insert carries a configuration, as shown, which will be embossed as a decorative pattern on the interior surface of the rim of a plastic plate thermoformed with use of this mold. Cavity 8 defined by the male and female members of the mold depicted in FIG. 2 is in the shape of the circular plate of this invention, which will be described more fully below. In this preferred embodiment the decorative pattern embossed by the mold of FIG. 2 will be carried on the first flat segment of the rim profile of the circular plate. It will be understood, however, that the mold of this invention can be machined to produce circular plates other than those of the rim design of this invention.

The portion of the mold other than the ring-insert can be made of any metal that can be machined or otherwise formed into the desired shape, with a mold body of aluminum being most preferred. Although the ring-insert can be made of any material whose surface can be modified to carry the desired decorative patterns, it is preferred that the insert be of a material that is compatible with the mold body materials with respect to thermal conductivity and thermal expansion. Magnesium and aluminum are the preferred materials for the ring-insert, with magnesium being most preferred. The exposed face 4 of the ring-insert can be embodied with the configuration of the desired decorative pattern by any means, such as engraving, milling, or chemical etching. It is also possible to produce the ring-inserts by powder metallurgy processes in which the metallic powders are compressed into a mold which itself contains the contours of the decorative pattern.

The most preferred method of embodying the face of the ring-insert with the pattern is by means of chemical etching. By use of this method, more intricate patterns are available, and virtually any pattern that can be photographed can be applied to the ring-insert. In the general application of this method, the desired pattern (in the general shape of the ring-insert surface) is photographically reduced to the actual size of the ring-insert, and a negative of the pattern prepared. The ring-insert is coated with a photo-resist material, and the negative is placed on the ring. The ring, covered with the negative, is then exposed to mono-chromatic light, of a wavelength appropriate to the photo-resist material being used, and the areas of the material exposed to the light through the negative are thereby cross-linked and hardened. The ring is then exposed to a chemical "developer" solution which washes away the uncross-linked (unhardened) photo-resist material and darkens the remaining cross-linked material. This ring is then chemically etched in an acid bath, the metal not covered by cross-linked material being exposed to the acid and etched thereby. When this chemical etching method is used, the preferred material of composition of the ring-insert is magnesium, particularly a photo-engraving magnesium available from Dow Chemical Company. Any conventionally used photo-resist coating can be used in the process, but Dow Chemical Company's Photo-Resist Coating or KPR-4 photo-resist coating from Eastman-Kodak Company is preferred.

Figure 3:
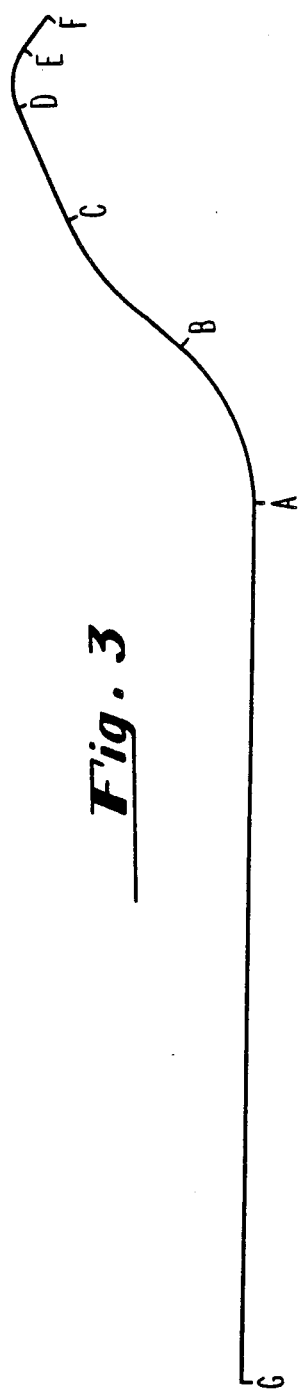
FIG. 3 is a fragmentary cross section of a plate of this invention take along a radius thereof.

In another aspect of the present invention, a foamed plastic plate of circular shape is provided. The plate has a generally flat circular base, and an intergral annular rim extending upwardly and outwardly from the base. FIG. 3 shows a fragmentary cross-section of a plate of this invention along a radius thereof, providing a view of the contour, and the profile, of the plate. As can been seen from the Figure, the plate has a generally flat base, depicted on this cross-section as radial line G-A. Point G corresponds to the center of the plate, and point A defines the junction between the base and the generally upwardly and outwardly curving rim, shown here as a contour curve A B C D E-F. With respect to the interior (or top) surface of the plate, segment A-B is concave, segment B-C is convex, segment C-D is flat, segment D-E is convex, and outer segment E-F is flat, point F defining the outer edge of the rim.

Figure 4:
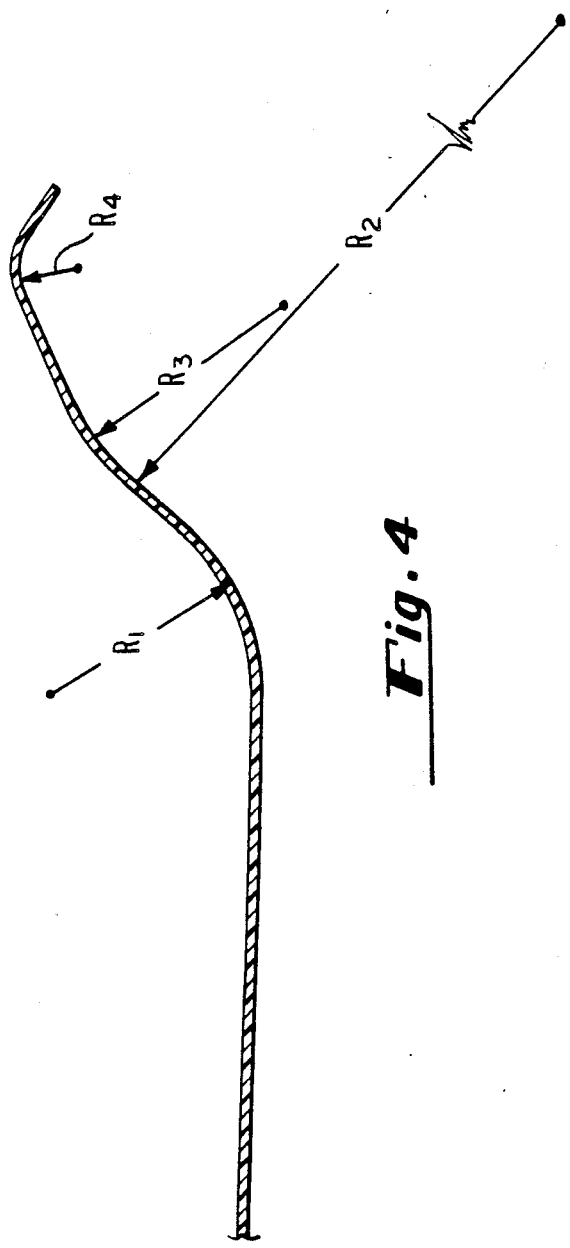
FIG. 4 is a more detailed view of the contour of the plate shown in FIG. 3.

Reference is made to FIG. 4 for a general description of the plate dimensions. $R_1$, $R_2$, $R_3$, and $R_4$ denote the radii of the various curve segments of the rim profile. It can be seen in the preferred embodiment shown here that convex segment B-C is actually composed of two differently curved sub-segments, having different radii of curvature $R_2$ and $R_3$. It is also within the scope of this invention that segment B-C have a single radius of curvature throughout its arcuate length, but the changing curvature indicated in the embodiment of FIG. 4 is preferred. As further seen, segments A-B and D-E are each uniformly curved, with radii of curvature $R_1$ and $R_4$, respectively.

While the exact radii of curvature will vary depending on the overall plate size, it may be stated that the general size relationship is $R_2 R_3 R_1 R_4$. With respect to the relative segment lengths, segments A-B and B-C are of approximately equal length, and are the two longest segments. Flat segment C-D is next largest, followed in decreasing length by segments D-E and E-F.

It has been found that these size relationships appear to alleviate much of the stress concentration that usually inheres in curve transistion points. Accordingly, foamed plastic plates of the present invention exhibit increased strength and stiffness and are less likely to break or bend at curve transistion points. For example, a plate composed of foamed polystyrene having the dimensions described below as a most preferred embodiment of this invention exhibited a stiffness of 1.03 pounds per inch as opposed to a stiffness of 0.75 pounds per inch exhibited by an existing commercial plate having the same composition, thickness, and overall size but having a different rim profile. Stiffness is measured by supporting the plate at a point on the edge of the rim and then applying a load at the center of the plate until the plate breaks or until the center is deflected, by bending of the plate, one inch.

The plates of this invention are made by conventional thermoforming methods such as those generally described above regarding operation of the mold of this invention. The plate can be made of any foamed polymer such as polystyrene, polyethylene, polypropylene, or polyvinylchloride. Preferred is polystyrene. As mentioned, the polymer is used in the form of a foamed sheet which is compressed between the corresponding mold sections. Polystyrene foam sheet can be prepared, for example, as disclosed in U.S. Pat. No. 3,444,283, which is incorporated herein by reference.

The plastic plates of this invention can be and preferrably are prepared with use of a mold such as that described above as being part of this invention. The annular rim of the plate can be embossed with a decorative design, preferably on the first flat segment (C-D) thereof. The presently disclosed mold is well suited for the thermoforming of such a plate. The mold depicted in FIG. 2, for example, is shaped to produce a plate corresponding to the preferred embodiment of the plate disclosed herein, and it can be seen in FIG. 2 that exposed face 4 of ring-insert 2, which carries the decorative pattern, corresponds to the first flat segment of the annular rim.

It will be understood that the invention is not limited to "plates" in the strict sense, and that other related articles such as bowls or dishes otherwise having the base and rim characteristics described herein, as well as molds for use in making such articles, are contemplated by the present invention.

We claim:
1. A mold for use in thermoforming thermoplastic sheet material into the shape of a circular plate comprising:
   (a) a dual-section mold body having corresponding male and female members which define a cavity in the shape of a circular plate when in the closed position the female member having a substantially flat circular base, an outwardly sloping annular rim and having an interior profile which in sequence from the junction of said rim and said base, has a concave segment, a first convex segment, and a second flat segment which defines the outer edge of said rim; said male member having an annular shaped recess formed therein in a portion of said member corresponding to the first flat segment of the female member;
   (b) a removable ring-shaped insert positionable within the recess to provide a surface of the male member partially defining the mold cavity; and
   (c) means for securing said insert within the recess, said means being such as to permit removal and replacement of the insert.
2. The mold of claim 1, wherein said insert has a configured face formed by chemical etching.
3. A mold of claim 1 wherein the insert consists essentially of magnesium.
4. The mold of claim 3 wherein the insert is configured to create a pattern in said plate.
5. The mold of claim 1 wherein the insert is configured to create a pattern in said plate.
6. A mold of claim 5 wherein the face of said insert defines the surface of the male member corresponding to the first flat segment of said rim shape.

* * * * *